United States Patent Office 2,868,833
Patented Jan. 13, 1959

2,868,833
ALIPHATIC DIAMINES AND SALTS THEREOF

Joseph Lester Szabo, Drexel Hill, and William F. Bruce, Havertown, Pa., assignors to American Home Products Corporation, New York, N. Y., a corporation of Delaware No Drawing. Original application August 26, 1952, Serial No. 306,514, now Patent No. 2,739,981, dated March 27, 1956. Divided and this application January 18, 1956, Serial No. 559,770

2 Claims. (Cl. 260—501)

This invention relates to derivatives of ethylene diamine and its homologues and, more particularly, to new mono- and poly-substituted-amino-alkylene diamine salts.

Certain substituted alkylene diamines have been found with bronchodilator and antihistaminic action and also found useful as intermediates in the preparation of desired organic compounds. In addition, it has been discovered that many of these compounds are useful for separating penicillin from aqueous solutions by forming a salt therewith. Many of the penicillin salts are substantially insoluble or, at most, sparingly soluble in an aqueous medium. One is thus able to isolate and, if desired, to purify penicillin since it has been found that the latter can be almost quantitatively removed from its solution by the addition of two molecules of penicillin to these particular diamines.

As an additional discovery, these substantially insoluble or sparingly soluble salts of penicillin have been found to be valuable from a pharmacological aspect since they are relatively non-toxic and, when in contact with body fluids, slowly release penicillin for utilization in combatting bacterial infections. A prolonged antibiotic effect can thus be achieved without difficulty. By the use of these new penicillin salts, one greatly reduces the number of injections required to sustain the desired blood level concentration of penicillin.

The useful diamines are those falling within the following general formulae: $R-NH(CH_2)_nNH_2$;

$R-NH(CH_2)_nNH-R_1$; and $RR_0N(CH_2)_nNH_2$ where R, $R_0$ and $R_1$ may represent either aliphatic, aromatic, alicyclic or heterocyclic radicals with and without substituents on the rings. In the alkylene portion of the molecule, $n$ is intended to represent a numeral greater than 1, preferably from 2 to 12.

The substituents, which may be of the aryl, alicyclic and heterocyclic rings as well as on the alkyl chain, may comprise one or more alkyl, alkoxy, halogen, nitro, amino, oxo or hydroxy ring substituents. As a matter of fact, with the exception of strong acid or oxidizing groups, no substituent has been found which interferes with the reaction of the N,N'-di-substituted secondary diamines with penicillin salts to form reaction products therewith.

In accordance with one method of preparing the di-substituted diamines of the invention, one starts with an aldehyde or ketone which may, if desired, be solubilized in a suitable solvent such as alcohol or benzene. To the aldehyde or ketone is added the alkylene diamine, generally in aqueous solution. The reaction product, which is a diimine having the formula:

$$R=N(CH_2)_nN=R_1$$

wherein R, $R_1$ and $n$ are the same as indicated before, is isolated and is then hydrogenated by catalytic reduction or by a metal-alcohol or metal-acid combination.

Where, for example, the radical R, $R_0$ or $R_1$ itself contains a double bond, the hydrogenation or reduction may be either partial, changing only the diimine to a diamine, or complete, with a reduction of the unsaturated radical to a saturated radical.

Di-substituted bases may also be formed in some cases by a simple substitution reaction, adding the desired substituents to the unsubstituted alkylene diamine.

Reactions to form compounds of the type $R-NH(CH_2)_nNH_2$ or $RR_0N(CH_2)_nNH_2$ may involve the reduction of an amide such as $R-CONH(CH_2)_n \cdot NH_2$ using metal hydrides for example, or an amination of a halogen compound such as $RR_0N(CH_2)_nCl$ utilizing ammoniacal ethanol.

The poly-substituted bases can alternatively be made by the reaction of an alkylene dihalide, such as the dibromide, dichloride or diiodide, with the appropriate amine.

Substituted alkylene diamine salts may also be prepared by interacting approximately equivalent quantities of a salt of the alkylenediamine, such as the dihydrochloride, dihydrobromide, dinitrate, diformate, diacetate or other suitable salt of ethylene diamine and an acid, with formaldehyde either in the form of its aqueous solution or as the solid polymeric form, paraformaldehyde, and with a compound containing an active hydrogen such as the alpha-hydrogen of thiophenes, picolines, quinaldines, phenols, aliphatic nitro-compounds, organic acids and esters, and open-chain and cyclic aldehydes and ketones in a suitable solvent such as water, alcohol or other organic solvents or mixtures thereof, resulting in an N,N'-disubstituted alkylene diamine salt which may be transposed into the free base by alkali treatment.

If the product obtained is to be used for the preparation of penicillin compounds, it is best used as a salt rather than in the form of the free base to avoid inactivating the penicillin. The salts may be formed from the free base by dissolving the latter in a solvent, such as ether, to which is added the proper acid, depending on the particular salt desired.

The salts formed may be either mono-salts or di-salts depending on the amounts of base and acid used. Thus, if one mol. equivalent each of acid and base were used, the mono-salt would be formed. On the other hand, if two mol. equivalents, or an excess of acid, are used with one mol. of the diamine, the di-salt would be formed. For making penicillin salts from the diamines, one would generally desire the double salt instead of the mono-salt since two mols. of penicillin would be combined when using the former, whereas only one mol. of penicillin combines with the mono-salt.

Inorganic or organic acids may be used in forming the salts from the free base, amino-substituted alkylene diamines. The most common inorganic acids are hydrochloric, sulfuric, phosphoric, nitric or hydrobromic acids, these forming in general sparingly water-soluble salts. On the other hand, organic aliphatic carboxylic acids are particularly preferred because in general they have been found to form water-soluble salts and these salts are of definite advantage in forming penicillin salts of the substituted alkylene diamines.

Organic acids which have proved useful are the lower aliphatic carboxylic acids of the mono-carboxylic-dicarboxylic, and tri-carboxylic classes. Lower alkyl, mono-hydroxy lower alkyl, a di-hydroxy lower alkyl carboxylic acids have been found useful as well as amino substituted compounds and unsaturated aliphatic acids. As specific examples of organic acids showing particular usefulness in forming water-soluble salts of the substituted alkylene diamines may be mentioned the acids of 1 to 6 carbon atoms as formic, acetic, propionic, butyric, isovaleric, glycolic, lactic, gluconic, amino acetic, and crotonic acids as examples of the mono-carboxylic type. Examples of the di-carboxylic class found to be particularly useful are the acids of 3 to 6 carbon atoms as malonic, succinic, glutaric, adipic, malic, tartaric, glutamic, maleic and fumaric acids. In the class of the tri-carboxylic acids, citric, iso-citric, and aconitic acids have been found particularly useful. While others will form suitable salts, these organic compounds mentioned will form highly desirable soluble salts whose solubility in water is at least about 5% by weight per unit of liquid volume at about 30° C.

By the term "water-soluble" salt, the applicants follow the generally understood meaning. In order to avoid any question as to meaning, the applicants prefer to consider a water-soluble salt to be one which will dissolve in water to the extent of at least about 5% by weight per unit of liquid volume at 30° C. A sparingly water-soluble salt would be one whose solubility in water would range from just below this figure to about 1% by weight, while a substantially insoluble salt would be one having a solubility less than about 1% by weight per unit of liquid volume.

In preparing sparingly water-soluble or substantially water-insoluble penicillin salts of the amino-substituted alkylene diamine salts, it is highly advantageous to obtain the penicillin salts as a precipitated solid from a substantially aqueous medium. The desired salt may then be easily separated, as by filtration, and purified by washing. Thus, the selected alkylene diamine salt is solubilized and reacted with a water-soluble salt of penicillin. The desired penicillin salt, being either substantially water-insoluble or only sparingly water-soluble, precipitates from the aqueous medium and is separated therefrom.

In the above procedure involving precipitation from an aqueous medium, it has been found advantageous to use relatively soluble diamine salts in preparing the penicillin salts thereof since less liquid volume is handled and therefore losses are likely to be less than if relatively insoluble salts were used. While salts made with the inorganic acids can be used in preparing the penicillin compounds, it has been found that their solubility is quite low and well below 5% on a weight basis. Consequently, water-soluble salts and particularly the diacetates, having a solubility in the neighborhood of about 10% or higher have been founds especially effective where it is desired to handle relatively low liquid volumes and therefore high concentrations.

Any of the known soluble penicillin salts may be combined with the poly-substituted diamines. Thus, one may use the alkali or alkaline earth metal salts of penicillin G, dihydro F, X, or penicillin K for combination with the selected diamine. However, the more preferred penicillin salts are the sodium or potassium salts of penicillin G. One or two molecules of any penicillin above indicated will unite with one molecule of the diamine, depending on the use of the mono- or the di-salt.

The following examples are given for specific illustrations but it should be understood that these are selected for illustration of the invention and not to be considered limitative.

EXAMPLE 1

*Preparation No. 1 of N,N'-dibenzylethylenediamine and salts thereof*

N,N'-dibenzylethylenediamine was first prepared by condensing benzaldehyde with ethylene diamine. The dibenzylethylenediamine (23.6 g.) was dissolved in 100 cc. methanol containing 0.5 g. Adams' platinum catalyst and hydrogenated at 50 lbs. pressure. Slightly more than the theoretical amount of hydrogen was absorbed in 45 minutes. The catalyst was filtered off, washed with methanol, the filtrate concentrated and the residue fractionated. Nearly all of the material distilled 160° and 0.75 mm., $n_D^{20}$ 1.5621.

With Raney nickel catalyst at room temperature little hydrogen absorption occurred, however, under elevated pressure hydrogenation went to completion but was much slower than with platinum. The diacetate was prepared by dissolving 440 g. of the base in about 3 liters of 95% alcohol and slowly adding 220 g. of glacial acetic acid. After standing some time the crystalline solid was filtered off and recrystallized from hot alcohol. Long, white needles, M. P. 110–112°.

Calcd. for $C_{16}H_{20}N_2 \cdot 2CH_3COOH$: C, 66.7; H, 7.78; N, 7.78. Found: C, 66.98; H, 7.63; N, 8.38. Solubility 252.9 g. per liter of solution at 30.4° in water. The dihydrobromide was obtained by adding hydrobromic acid to an aqueous solution of the acetate. Large colorless plates, recrystallized from water, M. P. 300° (bar.). Calcd. for $C_{16}H_{20}N_2 \cdot 2HBr$: N, 6.97; Br, 39.8. Found: N, 6.9; Br, 39.5. Solubility 30.0 g. per liter of solution in water at 30.4°.

The dihydrochloride was obtained from the acetate by addition of hydrochloric acid and recrystallized from water. Large white plates, M. P. 294° (bar.). Calcd. for $C_{16}H_{20}N_2 \cdot 2HCl$: N, 8.97; Cl, 22.4. Found: N, 8.8; Cl, 22.4. Solubility 23.9 g. per liter of solution in water at 30.4°.

The dinitrate was obtained by adding nitric acid to a solution of the acetate. Large white plates M. P. 274° (bar.). Calcd. for $C_{16}H_{20}N_2 \cdot 2HNO_3$: N, 15.3. Found: N, 14.9. Solubility 9.04 g. per liter of solution at 30.4°.

The phosphate was obtained by adding phosphoric acid to a solution of the acetate and recrystallized from dilute alcohol. White prisms, M. P. 232° (bar.). Calcd. for $C_{16}H_{20}N_2 \cdot 2H_3PO_4$: N, 6.42; P. 14.2. Found: N, 5.45; P, 13.9. Solubility 38.6 g. per liter of solution at 30.4°.

The sulfate was obtained by addition of sulfuric acid to a solution of the acetate and recrystallization from alcohol. White plates, M. P. 247–250°. Calcd. for $C_{16}H_{20}N_2 \cdot H_2SO_4$: C, 56.8; N, 8.29; H, 6.51; S, 9.47. Found: C, 56.37; H, 6.43; N, 7.99; S, 9.85. Solubility 15.8 g. per liter of solution at 30.4°.

The thiocyanate was prepared by addition of a solution of sodium thiocyanate to the acetate and recrystallized from alcohol. White needle-like plates, M. P. 212° bar.). Calcd. for $C_{16}H_{20}N_2 \cdot 2C_7H_6O_3$: N, 5.42. Found: Found: N, 15.4.

The salicylate was obtained by addition of a solution of sodium salicylate to a solution of the acetate and recrystallization from water. White crystals, M. P. 85° (bar.). Calcd. for $C_{16}H_{20}N_2 \cdot 2C_7H_6O_3$: N, 5.42; Found: N, 5.24.

The picrate was obtained from the acetate by addition of a solution of lithium picrate and recrystallization from alcohol, M. P. 211° (bar.).

The oxalate, $C_{16}H_{20}N_2 \cdot H_2C_2O_4$, was obtained as colorless needles from alcohol, M. P. 275–6°.

The salts of the lower aliphatic carboxylic acids mentioned hereinabove did not precipitate out on addition of their aqueous sodium salt solutions to the solutions of the acetate indicating that these salts were substantially water-soluble. To obtain these salts from an aqueous medium, the solutions are evaporated to dryness. A better procedure to obtain a purified water-soluble product is to solubilize the diamine free base in an organic solvent such as alcohol, acetone, diethyl ether, etc., and add the free acid also in solution in an organic solvent. The desired salt will either precipitate from solution, or the solvent solution may be evaporated to dryness.

The lactate was prepared by mixing alcoholic solutions of lactic acid and the base, N,N'-dibenzyl ethylenediamine. Fine white crystals were obtained having a melting point of 74° C.

The formate was prepared by adding 4.6 g. of 98–100% formic acid dropwise to 12 g. of N,N'-dibenzyl ethylenediamine dissolved in ether. An immediate precipitate formed. The solid was broken up in the ether suspension and filtered off, washed with ether and dried. M. P. 125–126°. The salt may be recrystallized from methyl-ethyl ketone.

The glutarate was prepared as with the formate salt but the addition was reversed, using 0.5 g. of glutaric acid to which was added 0.91 g. of the free base. M. P. 115–118°.

The maleate was prepared by first taking 4.9 g. of maleic anhydride and dissolving it in ether to which was added a few cc. of water. After sufficient time to permit the formation of the acid, an ethereal solution of 12 g. of free base was added slowly with vigorous agitation. An immediate precipitate of N,N'-dibenzyl ethylenediamine maleate formed which was filtered off, washed well with ether and air dried. M. P. 125–128° C.

The succinate was obtained in the following manner. 5.07 grams of succinic acid was dissolved in about 25 cc. of hot alcohol and to it was added a solution of 9.83 grams of the base, N,N'-dibenzyl ethylenediamine in about 25 cc. alcohol. Crystals gradually formed. After a few days, these were filtered off, washed with alcohol and dried in the steam oven. White crystals, M. P. 172–174° C. *Analysis.*—Calculated on the basis of 1 mol. of base combined with 1 mol. of acid, N calculated 7.82; found 7.00.

The malate was prepared as above using 5 grams of malic acid and 9 grams of base in about the same quantities of solvent. White crystals formed and were isolated. *Analysis.*—Based on 1 mol. of acid and base, N calculated 7.50, found 6.03. Carrying out the same reaction using 2 mols. of acid per mol. of base, a salt product was also obtained. *Analysis.*—N, calcd. 5.5; found, 5.32.

The propionate was prepared in the same manner as above using 5 cc. of base and 3.5 cc. of propionic acid with ether as the solvent. The propionate was obtained in the form of a sirup.

The butyrate was obtained by proceeding as above using 5 cc. of base and 4.1 cc. of isobutyric acid, with ether as the solvent. The butyrate was also obtained in the form of a sirup.

The valerate was obtained by proceeding as above using 5 cc. of base and 4.75 cc. isovaleric acid, with ether as the solvent. A white solid was formed. Softens about 80°, M. P. 82–3°. *Analysis.*—N, calculated 8.19; found 8.35.

The glycolate was obtained by the above procedure using 10 cc. of base and 4.8 grams of glycolic acid, the solvent being special denatured alcohol No. 30. A white solid was obtained.

The aconitate was prepared in similar manner using 5 cc. of base and 5.45 grams of aconitic acid, the solvent being special denatured alcohol No. 30. The aconitate salt was obtained as a sirup and having an acid reaction. A neutral salt was obtained by changing the amount of aconitic acid used to 7.25 grams.

The adipate was obtained in the form of a salt combining 1 mol. of base with 2 mols. of acid by carrying out the reaction as disclosed above using 10 cc. of base and 6.08 grams of adipic acid, the solvent being special denatured alcohol No. 30. The adipate was a white solid M. P. 103–105°. *Analysis.*—N calculated 5.27; N found 5.27.

The fumarate was obtained by the same procedure using 10 cc. of base and 4.85 grams of fumaric acid, the solvent being special denatured alcohol No. 30. A white crystal solid salt formed M. P. 220–223°.

The malonate was obtained in the same manner using 10 cc. of base and 5 grams of malonic acid, with ether as the solvent. The salt obtained combined 1 mol. of base with 2 mols. of acid. White solid, M. P. 124–125°. *Analysis.*—N calculated 5.86; found 5.79.

In obtaining the following group of salts, these were prepared by adding the free base slowly with stirring to a warm solution of the acid dissolved in the indicated solvent.

The aconitate was obtained using 1.3 grams of aconitic acid and 1.2 grams of base with acetone as the solvent. M. P. 140–142° dec.

The tartarate was obtained using 1.5 grams of d-tartaric acid and 2.4 grams of base, using ethyl alcohol as the solvent. M. P. 215–216°.

The crotonate was obtained by reacting 1.8 grams of crotonic acid with 2.4 grams of base, using ethyl alcohol as the solvent. M. P. 110–111°.

The citrate was obtained using 7.6 grams citric acid and 14.4 grams base, ethyl alcohol being the solvent. M. P. 201° C. dec.

The gluconate was prepared by reacting 7.12 grams of glucono-Δ-lactone, the solvent being a mixture of alcohol and water. The salt was obtained in the form of a sirup.

The glycolate was obtained by reacting 2.48 grams of glycolic acid and 4.8 grams of base, with acetone as the solvent, M. P. 120–121° C.

The glutamate was prepared by reacting 2.5 grams of mono-sodium glutamate with 2.15 grams of N,N'-dibenzyl ethylenediamine diacetate. The sodium salt was dissolved in water, converted to the disodium salt with 4% NaOH, pH (final) 8.5. This solution was treated with activated carbon. To the colorless filtrate was added a water solution of the diacetate. The glutamate salt had a melting point of 288–289° C.

In the above cases where solids did not come down immediately, some of the solvent was evaporated off, resulting in a precipitation of salt from the concentrated solution. In those cases where sirups resulted, crystals could sometimes be obtained by evaporation of part of the solvent and stirring or rubbing until crystallization took place. Often, simply standing overnight proved effective.

EXAMPLE 2

*Preparation of N,N'-bis-(2-heptyl)-ethylenediamine and salts thereof*

131.1 g. of 2-heptylamine and 214 g. of ethylene bromide were warmed on the steam-bath yielding a brownish-red sirup. On stirring the sirup with ether it slowly dissolved and precipitated a white solid. The solid was filtered off and recrystallized from methanol, M. P. 282°. Calcd. for $C_{16}H_{36}N_2 \cdot 2HBr$: N, 6.7; Br, 38.2. Found: N, 6.09; Br, 36.0. The picrate had M. P. 150°.

The hydrobromide was treated with sodium hydroxide solution yielding an oily upper layer which was extracted with ether. The ether layer was dried over solid sodium hydroxide, the ether removed and the residue fractionated. The product had B. P. 125–127° at 2 mm., $n_D^{20}$ 1.4498. Calcd. for $C_{16}H_{36}N_2$: C, 75.0; H, 14.07; N, 10.9. Found: C, 73.41, 7305; H, 12.50, 12.36; N, 10.58.

EXAMPLE 3

*Preparation of N,N'-dicyclohexylethylenediamine and salts thereof*

200 g. of cyclohexylamine and 50 g. ethylene chloride were warmed several hours on the steam-bath until the material became solid. Hot water was added and the mixture was made strongly alkaline. The oily layer began to crystallize as soon as it cooled a few degrees, and was separated from the liquid, large colorless crystals, M. P. 99°. On recrystallization from dilute alcohol the solid melted at 82°, yield 77.5 g. Calcd. for $C_{14}H_{28}N_2 \cdot H_2O$: N, 11.6. Found: N, 10.91.

The following salts were obtained by adding the corresponding acids to an alcohol solution of the base until no further precipitation occurred and recrystallizing the crude products from water:

Dihydrochloride, white plates, M. P. 315° (bar.). Calcd. for $C_{14}H_{28}N_2 \cdot 2HCl$: N, 9.43. Found: 9.14.
Dihydrobromide, white plates, M. P. 339 dec. (bar.).
Dinitrate, small white crystals, dec. 230° (bar.).
Diflavianate, small yellow crystals, dec. 312° (bar.).
Phosphate, white plates, M. P. 313° (bar.).
Picrate, yellow crystals, M. P. 218° (bar.).
Sulfate, large white plates, M. P. above 350° (bar.).

The acetate was prepared in ether from the base and acetic acid as large white crystals, M. P. 144°.

The acetate in water solution on treatment with potassium cyanate yielded the corresponding bis-urea, small white crystals from dilute alcohol, M. P. 248° (bar.).

The dinitroso compound was prepared from the acetate and sodium nitrite in water. White crystalline flakes, M. P. 130–1° (bar.).

EXAMPLE 4

*Preparation of N,N'-bis-(4-methyl-2-pentyl)-ethylenediamine*

200 g. of 2-amino-4-methylpentane and 94 g. of ethylene bromide were warmed on the steam-bath. The reaction was quite vigorous. The material was treated with a strong solution of sodium hydroxide and the dark oily layer extracted with ether. The ether layer was dried over alkali, the ether removed and the residue fractionated. After taking off all material up to a bath temperature of 200° at atmospheric pressure the remaining material comprising the desired product distilled between 95 and 97° at 1 mm., $n_D^{25}$ 1.4419.

EXAMPLE 5

*Preparation of N,N'-bis-(3,5,5-trimethylhexyl)-ethylenediamine and its salts*

286 g. of 3,5,5-trimethylhexylamine and 50 g. ethylene chloride were warmed on the steam-bath for several days after which time the reaction mass was very viscous and jellied on cooling. Water was added followed by a strong solution of sodium hydroxide. This was extracted with ether, the extract dried over solid sodium hydroxide, the ether removed and the residue fractionated. The fractions boiling between 123 and 200° at 0.06 to 0.08 mm. were combined and refractionated. Most of the material distilled 149 to 154° at 1.2 mm. and had $n_D^{22.5}$ 1.4548.

The acetate was prepared by adding acetic acid to an ethereal solution of the base and recrystallizing from ethyl acetate, small white flakes, M. P. 105°. Calcd. for $C_{20}H_{44}N_2 \cdot 2CH_3COOH$: N, 5.84. Found: N, 6.40.

The hydrobromide was prepared by adding hydrobromic acid to an alcoholic solution of the base and recrystallizing the product from dilute alcohol, fine white crystals, M. P. 246° (bar.). Calcd. for $C_{20}H_{44}N_2 \cdot 2HBr$: N, 5.36; Br. 30.6. Found: N, 5.8; Br, 33.15.

The hydrochloride was prepared in the same manner as the hydrobromide. Large white plates, M. P. 256° (bar.).

The nitrate was obtained as above. Large white flakes, M. P. 214° (bar.). Solubility 2.14 mg./ml. at 30°.

The phosphate obtained as above was recrystallized from dilute alcohol.

The sulfate was recrystallized from water. White crystals, M. P. 290° (bar.). dec. Calcd. for $C_{20}H_{44}N_2O_4S$: N, 6.83. Found: N, 6.31.

EXAMPLE 6

*Preparation of N,N'-bis(2-thenyl)-ethylenediamine and a salt thereof*

In a 500 ml. three-necked flask, fitted with stirrer, condenser and thermometer, were mixed 42 g. (0.5 mol.) of thiophene, 33 g. (0.25 mol.) ethylenediamine dihydrochloride and 43 ml. of 36% aqueous formaldehyde (0.5 mol.). The mixture was stirred and heated to gradually raise the temperature. At 60° a vigorous reaction began. Heating was stopped and an ice-bath applied to the flask. The internal temperature rose to 73° and the reaction mixture solidified. 200 ml. of 50% aqueous alcohol were added and stirred and the mixture was heated an additional 1½ hours. After cooling, the reaction product was filtered and washed with water. The white product was amorphous and did not dry well, nor could it be crystallized.

It was dissolved in 250 ml. hot water, cooled, and made alkaline with 40% sodium hydroxide. The free base which separated was not very soluble in ether, and was taken up in benzene, dried over sodium hydroxide and obtained as a colorless, viscous oil on removing benzene in vacuo. The oil was converted to diacetate by dissolving in 200 ml. ethyl acetate and adding 12 ml. glacial acetic acid. The precipitated salt was filtered, washed with ethyl acetate and dried, M. P. 84° (bar.).

In essentially the same manner as taught by Example 6, one may also react an alkylene diamine such as ethylenediamine and an acid, as, for example, hydrochloric, sulfuric or formic acid, to form the di-acid salt of the alkylene diamine, and using 0.25 mol. of the di-acid salt together with half a mol. of formaldehyde, half a mol. of the following compounds may be reacted therewith to form the corresponding symmetrical disubstituted alkylene diamines: cyclohexanone, 2,3 and 4-methylcyclohexanone, 4-methoxy-cyclohexanone, cyclopentanone, 2-methylthiophene, isoquinoline, 3-methyl-isoquinoline and quinaldine.

EXAMPLE 7

*Preparation of N,N'-bis-(beta-phenylethyl)-ethylenediamine and a salt thereof*

48.2 g. of beta-phenylethylamine and 18.8 g. ethylene bromide were warmed on the steam-bath. The reaction was vigorous and after standing some time at room temperature the mass crystallized. The reaction product was made alkaline, extracted with ether and the ether layer extracted with dilute acetic acid. The acid extract was made alkaline, extracted with ether; the ether layer dried over magnesium sulfate, filtrated through carbon and the ether removed. The residue was then distilled; all volatile material was taken off up to 210° at 1.5 mm. The residue was taken up in ether and treated with glacial acetic acid. The solid was filtered off and recrystallized from ethyl acetate to give small white needles, M. P. 114°.

In the same manner as taught hereinabove, an alkylene dihalide such as 1,2-dichloroethane may be reacted with laurylamine, 3-methyl-cyclohexylamine, m-nitraniline, 2-amino-6-methyl-pyridine, 2-amino-4-methyl pyridine, 2-amino-5-methyl-pyridine, 2-amino-3-methyl-pyridine, 2-amino-thiazole, or 2-amino-5-methyl-furan to form the symmetrically di-substituted alkylene diamine and desired salts thereof. The reaction mixture, after making strongly basic with alkali such as sodium hydroxide, may be extracted with ether and the ether extract distilled to obtain the desired product as a crystalline or solid residue.

EXAMPLE 8

*Preparation of N-ethyl-ethylenediamine and a salt thereof*

12 grams of monoacetylethylenediamine was added to 3.85 grams lithium aluminum hydride in 350 cc. of anhydrous ether. The mixture was stirred and refluxed 8 hours. 50 cc. of cold water was added slowly. The solution was filtered and the residue washed with water. The ether was evaporated off at room temperature and the aqueous filtrate made alkaline with solid NaOH, till two layers appeared. The organic layer was separated and further dried over NaOH. The product was distilled through a small column. B. Pt.: 126–130° C.

N-ethyl-ethylenediamine di-picrate: M. Pt. 210–11° C. Analytical (di-picrate): Calculated, N=20.60. Found: N=20.51.

EXAMPLE 9

*Preparation of N,N'-di-3,3'-octylmercaptopropyl-ethylenediamine*

To a benzene solution of 6 g. of N,N'-diallylethylenediamine and 8.5 g. octyl mercaptan there was added 1 cc. of triton B (benzyltrimethylammonium hydroxide—35% solution in water) as a catalyst and the mixture refluxed on a steam bath for 27.75 hours. The benzene solution was washed with water, dried over anhydrous magnesium sulfate, the benzene distilled off and the residue fractionated. The first fraction was unchanged diallylethylenediamine and octyl mercaptan, the second boiled at 180–198°/4.6–4.8 mm.

EXAMPLE 10

*Preparation of N,N'-di-beta-ethoxyethylethylenediamine*

To a refluxing solution of 50 cc. of redistilled 80% ethylenediamine in 50 cc. absolute alcohol 60 g. of beta-ethoxyethyl chloride was added over a period of one hour and refluxing was continued for 26 hours. On cooling a solid crystallized out. An equal volume of water was added and most of the alcohol distilled off. The resulting solution was made strongly alkaline, extracted with benzene, the benzene solution dried over anhydrous magnesium sulfate, filtered, the benzene distilled off and the residue distilled under atmospheric pressure. Most of the material distilled between 230 and 290°. The slightly yellowish distillate was fractionated through a glass helices packed column under reduced pressure. The main fraction distilled at 108–116°/3.8–3.9 mm.

Following the procedures disclosed hereinabove, the following compounds may be made and fall within the general scope of the invention. These compounds are also deemed useful, either as the free base or the acid-addition salts, for their therapeutic action, as intermediates or for the purpose of isolating penicillin salts.

| Monosubstituted diamines: | Starting materials |
|---|---|
| N-undecylethylenediamine | Undecylaldehyde and ethylenediamine diformate. |
| N-heptylethylenediamine | Heptaldehyde and ethylenediamine diformate. |
| N-(3,5,5-trimethylhexyl)-ethylenediamine | 3,5,5-trimethylhexaldehyde and ethylenediamine diformate. |
| N-2-thenylethylenediamine | Thiophene, formaldehyde, ethylenediamine-di HCl salt. |
| N-p-chloro or bromophenylethylene diamine | N-phenylethylene diamine and Cl₂ or Br₂. |
| N-vanillylethylenediamine | Vanillin, ethylenediamine diformate. |
| N-2,4 or other dichloro or bromophenylethylene diamine | N-phenylethylene diamine and Cl₂ or Br₂. |
| N-2- or 4-pyridylethyl-ethylenediamine | 2- or 4-picline, formaldehyde, ethylenediamine di-HCl salt. |
| N-2-or 4-quinolylethyl ethylenediamine | 2- or 4-quinaldine, formaldehyde, ethylenediamine di-HCl salt. |
| N-4-methoxycyclohexyl-ethylenediamine | 4-methoxycyclohexanone and ethylenediamine diformate. |
| Disubstituted diamines: | |
| N,N'-di-n-heptylethylenediamine | Heptaldehyde, ethylenediamine diformate. |
| N,N'-di-undecyl ethylenediamine | Undecylaldehyde, ethylenediamine diformate. |
| N,N'-dicyclopentylethylenediamine | Cyclopentanone, ethylenediamine diformate. |
| N,N'-di-4-methoxy cyclohexyl-ethylene diamine | 4-methoxy cyclohexanone, ethylenediamine diformate. |
| N,N'- divanillylethylenediamine | Vanillin, ethylenediamine diformate. |
| N-cyclohexyl-N'-ethylethylenediamine | N-cyclohexylethylene diamine, acetaldehyde, H₂ (n:). |
| N-benzyl-N'-vanillylethylene diamine | N-benzylethylenediamine, vanillin, formic acid. |
| N-methyl-N-phenylethylene diamine | Methyl aniline, chloracetal, followed by ammonium formate-formic acid. |
| N,N'-di-undecyleneylethylenediamine | Undecylenoylchloride, ethylenediamine followed by reduction with lithium aluminum hydride. |
| N,N'-di-omega-brompropyl-ethylenediamine | N,N'-diallylethylenediamine and hydrobromic acid. |
| N,N'-di-omega-hydroxypropyl-trimethylenediamine | Trimethylenechlorohydrin and trimethylenediamine. |
| N,N'-di-beta-vinyloxyethyl-ethylenediamine | Vinyl-beta-chlorethylether and ethylenediamine. |
| N,N'-di-beta-carboxamido-methyl-ethylenediamine. | Chloracetamide and ethylenediamine. |

The following examples illustrate the preparation of penicillin salts from the corresponding substituted alkylene diamines.

EXAMPLE 11

*Preparation of N-mono-benzylethylenediamine di-penicillin-G*

224 mg. of N-mono-benzylethylenediamine dihydrochloride was dissolved in about 2 cc. of water. To this a solution of 712 mg. of sodium penicillin dissolved in 2 to 3 cc. of water was added. A clear solution resulted from which an oil precipitated in a few minutes. The water layer was poured off and the oil placed in a desiccator over phosphorus pentoxide. In a short time white crystals appeared and all of the oil solidified. On heating at any temperature between 124 and 191°, this material melted and immediately solidified to a white foamy, very viscous mass. At 191° (bar.) the solid melted to a liquid which darkened and decomposed without giving the white foamy mass.

EXAMPLE 12

*Preparation of N-mono - (p - hydroxybenzyl)-ethylenediamine di-penicillin-G*

240 mg. of N-mono - (p - hydroxybenzyl)-ethylenediamine dihydrochloride was dissolved in about 2 cc. of water. To this solution 712 mg. of sodium penicillin dissolved in about 2 to 3 cc. of water was added. An immediate white granular precipitate formed which was filtered off, washed with water and dried over phosphorus pentoxide. The M. P. was 131° (bar.).

EXAMPLE 13

*Preparation of N,N'-dibenzylethylenediamine di-penicillin-G*

To a solution of 60 g. of sodium penicillin G in 800 cc. of distilled water cooled to 0–4° in an ice-bath, a solution of 35 g. of N,N'-dibenzylethylenediamine diacetate in 200 cc. of distilled water is added dropwise with stirring. The thick slurry is filtered with suction, washed twice with 100 cc. of cold water, dried by suction and spread out in a thin layer for completion of drying. The product weighed 80 g.

The air-dried powder has a broad melting point, sintering at 100°, melting above 110° to a cloudy liquid becoming clear at 135°. It has 7.7–9.6% water (of crystallization), which can be removed on drying in a Fischer pistol. Analysis of the dried sample showed: C, 63.86; H, 6.41; S, 6.74. Calcd. for $$2C_{16}H_{18}O_4N_2S \cdot C_{16}H_{20}N_2$$

C, 63.8; H, 6.20; S, 7.08. Ash was negligible. Assay showed on a dry basis 1235 units per mg. (calcd. 1307).

EXAMPLE 14

*Preparation of N,N'-dipiperonylethylenediamine di-penicillin-G*

To a solution of 1.07 g. sodium penicillin in about 2 ml. cold water, a solution of 0.7 g. N,N'-dipiperonyl-ethylenediamine acetate in about 2 ml. cold water, was slowly added with stirring. The white insoluble solid was filtered off, washed with water and dried over phosphorus pentoxide.

EXAMPLE 15

*Preparation of N,N'-difurfurylethylenediamine di-penicillin-G*

Sodium penicillin (1.07 g.) is dissolved in about 2 ml. water cooled in an ice-bath. To the clear solution, 0.5 g. of N,N'-difurfurylethylenediamine acetate dissolved in about 2 ml. of cold water is slowly added with stirring. A white, insoluble, crystalline powder is formed which is filtered off, washed with cold water and dried in a desiccator over phosphorus pentoxide.

It is obvious that the insoluble organic base penicillin salts formed contain two mols. of penicillin for each mol. of organic base when a di-salt of the substituted diamine is used and when an excess of penicillin salt is present, as is indicated by the analysis of the N,N'-dibenzylethylenediamine salt, and by the assays of the N,N'-dibenzyl-, N,N'-difurfuryl and N,N'-dipiperonylethylenediamine penicillin salts. The best procedure for insuring the formation of a di-salt is to add the base salt water solution into the acid or penicillin solution, and if relatively large crystals are desired, the rate of addition should be slow with a relatively low concentration during reaction. Another way to insure the formation of a di-salt is to add the two aqueous solutions simultaneously in such a way as to get equivalent amounts reacting at any one time.

It is also possible to obtain the mono-salt, that is the combination of one mol, organic base to one mol, of penicillin. If one were to reverse the addition described above, namely by adding the solution of penicillin salt to the water solution of the base salt, one could obtain the mono-penicillin salt.

Penicillin salts can also be prepared by adding non-aqueous solutions of free penicillin to non-aqueous solutions of the organic bases by using suitable solvents such as ether, acetone, ethylacetate, amylacetate, etc. This procedure can be carried out provided one avoids an excess of base which inactivates or decomposes the penicillin.

Besides the penicillin salts hereinabove described and those made from the alkylenediamines mentioned, the following mono- and di-penicillin salts are also deemed useful for the reasons indicated.

N-octylethylenediamine di-penicillin
N,N'-di-methallylethylenediamine di-penicillin
N,N'-di-propargylethylenediamine di-penicillin
N,N'-dicrotylethylenediamine dipenicillin
N,N'-di-phenylethylenediamine di-penicillin
N,N'-di-1(or 2) naphthyl ethylene diamine di-penicillin
N,N'-di-2-pyridylethylenediamine di-penicillin
N-benzhydrylethylenediamine di-penicillin
N,N'-di-benzhydrylethylenediamine di-penicillin
N-veraterylethylenediamine di-penicillin
N,N-di-veraterylethylenediamine di-penicillin
N-benzyl - N' - p-methoxybenzylethylenediamine di-penicillin
N,N'-dibenzyl-1-methylethylenediamine di-penicillin
N,N-dicyclohexylethylenediamine mono-penicillin
N,N-diamyl ethylenediamine mono-penicillin
N-ethyl-N-phenylethylenediamine mono-penicillin Penicillin salts, prepared in accordance with the illustrative examples, are listed with their melting points:

| Organic base salt | Form of di-penicillin-G salt | M. P., °C. |
| --- | --- | --- |
| N,N'-dibenzylethylenediamine diacetate. | White crystalline pwd. | ca.110–135. |
| N,N'-dipiperonylethylenediamine diacetate. | White pwd. or colorless crystals. | 112–119. |
| N,N'-bis-(p-chlorobenzyl)-ethylenediamine diacetate. | White crystals | 110–119. |
| N,N'-bis-(2,4-dichlorobenzyl)-ethylenediamine diacetate. | Yellowish prisms | 95–100. |
| N,N'-bis-(p-nitrobenzyl)-ethylenediamine diacetate. | White crystals | 95–100. |
| N,N' - bis - (p - hydroxybenzyl) - ethylenediamine dihydrochloride. | ___do___ | 140–145. |
| N,N' - bis - (p - methoxybenzyl) - ethylenediamine diacetate. | ___do___ | 100–103. |
| N,N' - bis - (p - aminobenzyl) - ethylenediamine dihydrochloride. | White, granular cryst. | 144–8. |
| N - benzyl - N' - (alpha - ethylbenzyl) - ethylenediamine dihydrochloride. | White crystals | 105–8. |
| N,N'- bis - (beta - phenylethyl) - ethylenediamine diacetate. | ___do___ | 95–102. |
| N,N' - bis - (gamma - phenylpropyl) - ethylenediamine dihydrochloride. | ___do___ | 78–83. |
| 1,3 - bis - (benzylamino) - propane diacetate. | ___do___ | 100–102. |
| 1,5 - bis - (benzylamino) - pentane diacetate. | White glass | 120–140. |
| N,N' - difurfurylethylenediamine diacetate. | White crystalline pwd. | 83–86. |
| N,N' - di - 2 - thenylethylenediamine diacetate. | White crystals | 145–7. |
| N,N' - dicyclohexylethylenediamine diacetate. | ___do___ | 155–6. |
| N,N' - bis - (4 - methyl - 2 - pentyl) - ethylenediamine diacetate. | Colorless solid | 165. |
| N,N' - bis - (2 - heptyl) - ethylenediamine diacetate. | Crystalline solid | 75–85. |
| N,N' - bis - (3,5,5 - trimethylhexyl) - ethylenediamine diacetate. | White crystals | 90–95. |
| N,N' - bis - (p - methylbenzyl) - ethylenediamine diacetate. | ___do___ | 90–97. |
| 1,10 - bis - (benzylamino) - decane diacetate. | White solid | 106. |
| N,N' - bis - (ethyl) - ethylene diamine - dihydrochloride. | White, cryst | 172–3. |
| N,N' - bis - (n - propyl) - ethylenediamine diacetate. | White, granular | 120. |
| N,N' - bis - (isopropyl) - ethylenediamine diacetate. | Fine white cryst | 145–150. |
| N,N' - bis - (n - butyl) - ethylenediamine diacetate. | ___do___ | 155–163. |
| N,N' - bis - (isobutyl) - ethylenediamine diacetate. | White solid | 127–129. |
| N,N' - bis - (sec. butyl) - ethylenediamine diacetate. | White, granular | 135–145. |
| N,N' - bis - (1 - cyclopropylethyl) - ethylenediamine dihydrochloride. | White cryst | 73. |
| N,N'- bis - (hexahydrobenzyl) - ethylenediamine dihydrochloride. | ___do___ | 151. |
| N,N'- bis - (4 - methylcyclohexyl - 1) - ethylenediamine dihydrochloride. | ___do___ | 156. |
| N,N' - dimethylethylenediamine di - hydrochloride. | White solid | 147–149. |
| N,N'- dibenzhydrylethylenediamine - dihydrochloride. | ___do___ | 118–119. |
| N - methyl - ethylenediamine dihydrochloride. | ___do___ | 252–3. |
| N - dodecyl - ethylenediamine - di - hydrochloride. | ___do___ | 232–3. |
| N,N' - di - beta - ethoxyethyl - ethylenediamine diacetate. | ___do___ | 85–90. |
| N,N' - di - allylethylenediamine - di - hydrochloride. | White cryst | above 85 (foam). |
| N,N' - diisopropyl - decamethylene - diamine-diiodide. | White solid | 175. |
| N,N'- di - n - octyldecamethylene -diamine-diacetate. | ___do___ | 176. |
| N,N' - di - beta - cyclohexylethyl - ethylenediamine-dihydrochloride. | ___do___ | 118–120. |
| N - (2 - methoxy - 6 - chloro - 9 acridyl) - ethylenediamine diacetate. | Yellow solid | above 155 (foam). |
| N - mono - beta - cyclohexylethyl - ethylenediamine-dihydrochloride. | White solid | 231–3. |
| 1,2 - ethylenediamine - bis - (N - 2 heptyl acetamide) diacetate. | ___do___ | 108. |

With regard to crystal size, the rapid addition of a water solution of the base salt to a water solution of the penicillin salt will usually produce very finely divided crystals of micro size. These are highly water retentive and difficult to wash. Where relatively large crystals are desired, it is important to bring the two aqueous solutions of reactants together in low concentration. This can be done by adding the reactants together in small amounts to a relatively large body of water, thus obtaining the low concentration necessary.

The penicillin salts obtained as described are insoluble in most of the usual laboratory solvents, but have very appreciable solubility in formamide and dimethyl formamide. Many are only sparingly soluble or substantially insoluble in water.

The solubility properties of the penicillin salts of the invention are such that many substituted alkylene diamines could be used in any stage of the recovery process for the isolation of penicillin. Since a substantial number of compounds, particularly those of higher molecular weight, are either insoluble or only sparingly soluble in water, a precipitation from the buffered penicillin extract is possible. With regard to N,N-dibenzylethylenediamine, for example, the free base could be used for precipitation of penicillin from the amylacetate extracting liquors since the base is soluble in this medium. The diacetate or any other water-soluble salt could, of course, be used for the aqueous precipitation. The versatility of these compounds is clearly obvious.

When the diamine penicillin salts are used for therapeutic purposes, they may be used for injection either with a spreading agent such as hyaluronidase, with a suspending agent such as carboxymethyl cellulose or pectin, or in a vegetable oil vehicle either with beeswax or aluminum monostearate gel, the composition being made up in substantially the same manner as any other sparingly soluble penicillin salt known to the art.

The diamine penicillin salts herein disclosed vary in their solubility in water from sparing solubility to substantial insolubility. Because of this action, there is a variation in their therapeutic effects ranging from quickly measurable blood levels to delayed blood level measurements. The clinician is therefore given a wide choice of penicillin products with varying times of onset of action. Further variations may be made by mixing fast-acting and slow-acting compounds, whether this involves combinations of the diamine penicillin or combinations of procaine penicillin or other known compounds with one or more compounds of the invention.

Many modifications and changes within the skill of the art are contemplated without departing from the scope of the invention as defined in the appended claims.

This application is a division of application Serial No. 306,514, filed August 26, 1952, now Patent No. 2,739,981, which in turn is a continuation-in-part of application Serial No. 174,115, filed July 15, 1950, now Patent No. 2,627,491.

We claim:

1. As new compounds, the water-soluble lower aliphatic acid-addition salts of N,N'-bis-(3,5,5-trimethylhexyl)-ethylenediamine.

2. The new compound, N,N'-bis-(3,5,5-trimethylhexyl)-ethylenediamine diacetate.

References Cited in the file of this patent

Zienty et al.: J. A. C. S., vol. 67, pp. 1040 (1945).
Linsker et al.: J. A. C. S., vol. 68, 1432 (1946).